Nov. 18, 1941.  S. S. RATHBUN  2,263,103

AUTOMATIC VALVE

Original Filed March 3, 1937  4 Sheets—Sheet 1

INVENTOR.
Sherrill S. Rathbun
BY
Paul M Klein
ATTORNEYS.

Nov. 18, 1941.  S. S. RATHBUN  2,263,103
AUTOMATIC VALVE
Original Filed March 3, 1937   4 Sheets-Sheet 2

INVENTOR.
Sherrill S. Rathbun
BY
Paul M. Klein
ATTORNEYS.

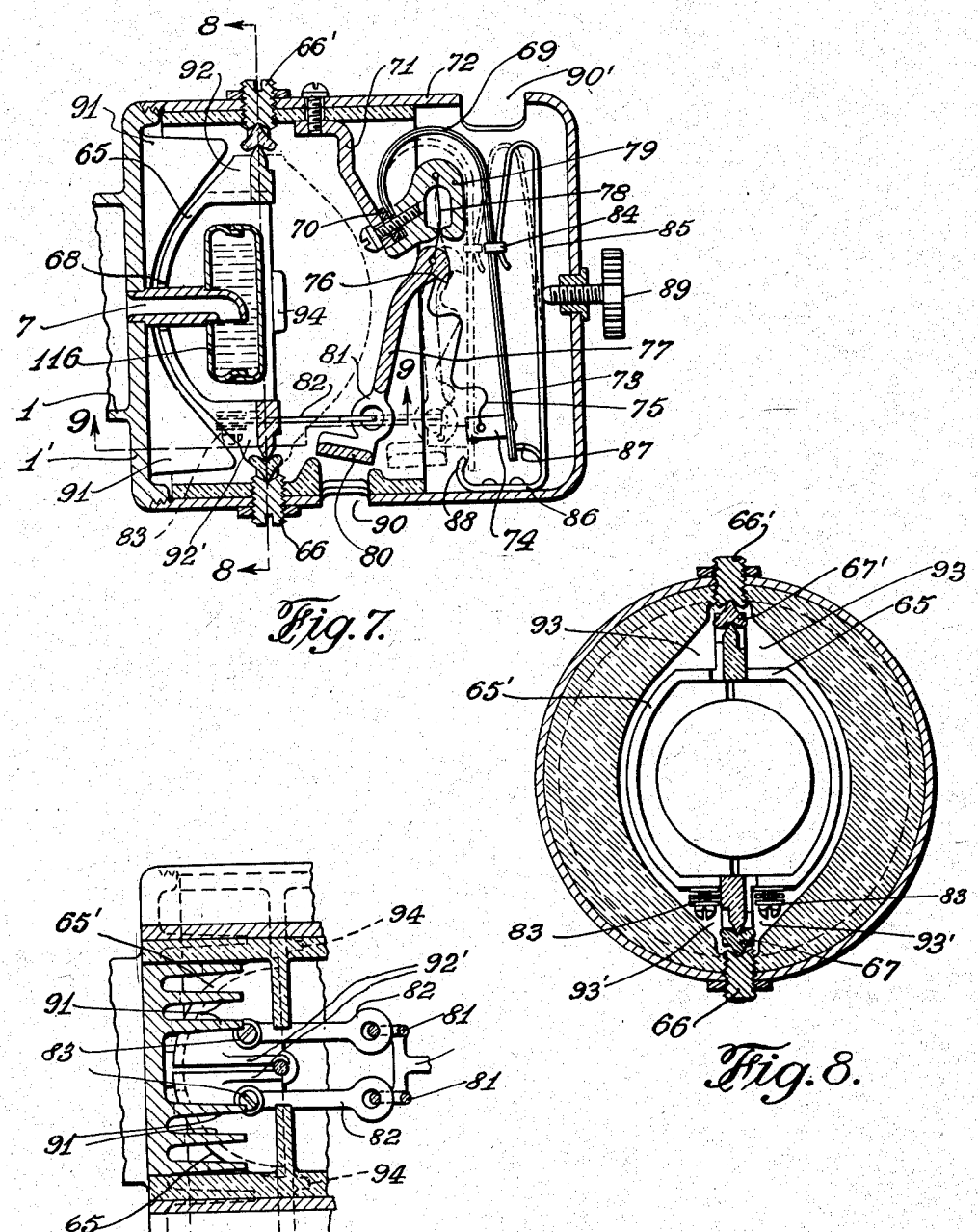

Nov. 18, 1941.  S. S. RATHBUN  2,263,103
AUTOMATIC VALVE
Original Filed March 3, 1937  4 Sheets-Sheet 4

INVENTOR.
Sherrill S. Rathbun
BY
ATTORNEYS.

Patented Nov. 18, 1941

2,263,103

UNITED STATES PATENT OFFICE 2,263,103

AUTOMATIC VALVE

Sherrill S. Rathbun, Rockville Centre, N. Y.

Substituted for abandoned application Serial No. 128,714, March 3, 1937. This application February 10, 1941, Serial No. 378,281

16 Claims. (Cl. 236—42)

This is a substitute for abandoned application S. N. 128,714, filed March 3, 1937.

This invention relates broadly to valves controlling the flow of either heating or cooling media, and particularly to thermostatically controlled and thermostatically motorized, quick-acting devices of this type.

The prime object of this invention is to provide a thermostatically controlled and thermostatically actuated valve, wherein these two functions of the device are not only effected, but are directly affected by a combination of the temperatures, composed of the temperature of the room in which the device is installed, and the temperature of the device itself, derived from exposure to the medium controlled by it.

Another object of this invention is to provide an accurately functioning, dependable device of this kind, adapted for controlling either heating or cooling systems, such as, for instance, what is known as one-pipe heating systems, wherein it is desirable that the action of the device is quick or direct, for either fully closing or fully opening the passage for controlling the heating medium, at the very slightest change in temperature; or for two-pipe heating systems, wherein the operation of the device has to be gradual.

Another object of this invention is to provide a thermostatically controlled and thermostatically operated valve, wherein the throttle, controlling the flow of the medium to be controlled, is positive acting, that is, one which causes the throttle to move from one extreme to the other extreme position, without tarrying in any intermediate position, and wherein the temperature of the medium controlled is used as a relay to control the function of the valve.

Another object of this invention is to provide a thermostatically controlled and a thermostatically operated valve, wherein the control mechanism is not called upon to provide the power for directly operating the means for controlling the medium to be controlled, but wherein the temperature of the medium itself effects the closing and opening of the device.

Another object of this invention is to provide in a valve of this kind a thermo-motor, a portion of which is directly exposed to the influence and temperatures of the medium to be controlled, and wherein means are provided, whereby the temperature differential of that medium-exposed member may be compensated or over-compensated, and whereby the lag in operation of the device, caused by temperature changes, occurring either in the room in which the valve is installed, or by the controlled medium itself, or both, is also compensated.

Another object of this invention is to provide a valve of this kind, consisting of an independently operating thermo-motor and a thermostatically controlled mechanism, which is independent of such motor, and wherein the operative or interior portion of that motor, controlling the medium to be controlled, is directly exposed to the influence of that medium, and wherein another exterior portion of that thermo-motor is normally exposed, to a large extent, to the outside or room temperature, whereas it is exposed, to a smaller extent, to the temperature of the device itself, induced by the controlled medium, and wherein said mechanism governs the degree and the time of exposure to temperature variations of the exterior motor part, and wherein said mechanism is controlled thermostatically, but independently of said thermo-motor.

Another object of this invention is to provide a valve of this kind, comprising an independent thermo-motor and an independent thermostatically actuated motor control, in which the motor consists of an interior operating portion, directly exposed to the influence of the medium to be controlled, and an exterior, relatively stationary portion, the function of which latter governing the movement of said operating portion; said motor control being provided with means for controlling the degree and time of exposure of said exterior motor portion, the control mechanism being governed by an independent thermostatic element, and wherein the operation of that mechanism is that of a snap action, and wherein means are provided for adjusting and regulating the operation of the mechanism, and of such snap action, by the adjustment of the independent thermostatic element.

Another object of this invention is to provide a thermostatically operated and thermostatically controlled valve, wherein the valve is operated by a thermo-motor, an exterior portion of which is normally exposed to a large extent to the room temperature, and to a smaller extent to the temperature emanating from the valve housing, exposed to the medium passing therethrough, and wherein the operation of the thermo-motor is controlled by the operation of a mechanism, which latter is governed by an independent thermostatic element, and which mechanism includes a closure or insulator, which is adapted to either partially or fully enclose the exterior portion of the thermo-motor, or partially or fully expose the same, and wherein that mechanism, and the mounting therefor, is provided with controllable air circulating means, and wherein the mechanism is so arranged as to provide or prevent or minimize air circulation by a definite snap action movement.

The foregoing and still further objects and important advantages of this invention will be more fully apparent from the ensuing description and the accompanying drawings, which latter, although illustrating various forms of my invention, are not intended to limit the same to the actual showing, and wherein Fig. 1 is a vertical section through one embodiment of my invention;

Fig. 7 illustrates a partial cross-sectional view through a sixth modification of my device, employing an orange-peel shaped pocket closure or insulator for the stationary thermo-motor portion;

Fig. 8 is a cross-section of Fig. 7 taken on line 8—8;

Fig. 9 is a partial cross-section of Fig. 7 taken on line 9—9;

Figure 1:
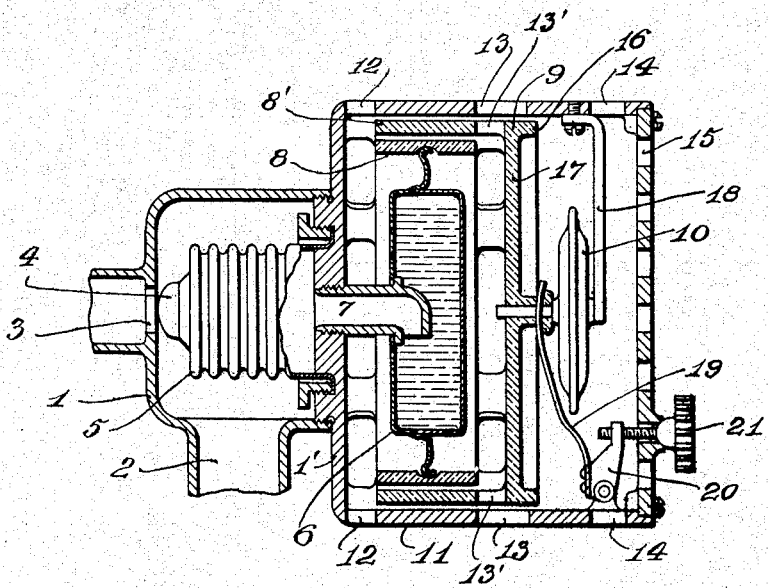

Referring now specifically to the drawings, and particularly to Fig. 1, numeral 1 denotes a valve housing provided with an intake port 2, and an outlet port 3, which latter may be either closed or opened by a throttle 4, secured to the operative end of bellows 5. This valve is intended to control the flow of either a heating or a cooling medium passing through the valve housing into a heating or cooling radiator, and it is evident that bellows 5 are permanently, directly and fully exposed to the influence of the medium controlled by it, that is to the temperature and the pressure of the medium, irrespective of whether throttle 4 is closed or open.

The bellows are attached at one end to the rear wall 1' of the valve housing, and form the "interior," operative part of the thermo-motor. Chamber or vessel 6, which is connected with bellows 5 by a communicating pipe or passage 7, forms the "exterior," substantially stationary member of the thermo-motor. Both the bellows and chamber 6 are filled with a thermostatic medium, such as an easily evaporative liquid, or with a combination of liquid and gases, which media expand or contract according to the temperature affecting them. Slight variations of temperature will cause a rapid operation of bellows 5 for either closing or opening port 3 by throttle 4. The liquids used in the bellows may be either alcohol, ether, gasoline, kerosene or similar liquids, while the gases employed may be either air or any gaseous formations of the aforesaid liquids. Other liquids and gases which may be usefully employed are those of the ethyl family.

For all practical purposes it is intended, when my device is to control a heating fluid, that the thermostatic medium within the thermo-motor, irrespective of whether it is wholly in liquid form or whether it consists of a combination of liquid and gaseous matter, should fill or nearly fill with its liquid portion the exterior chamber 6, while only the gaseous portion or the gases created by the evaporation of the liquid medium are to fill bellows 5. Only when the evaporation of the liquid medium is incomplete, or when condensation should take place, a small quantity of liquid may temporarily remain in the bellows. Passage 7 connecting chamber 6 with bellows 5 is purposely designed to be relatively short and is of sufficiently generous dimensions to provide a quick, unrestricted flow of a thermostatic medium from the chamber to the bellows and vice versa.

Exterior member 6 is mounted in a stationary inner band 8, which is surrounded by an outer movable cylindrical band 8' of closure 9, and which movable band is attached to or forms an integral part of the closure. Both the bands and closure 9 are made of insulating material, which may be either non-conducting or reflecting, or both, or may be equipped with conducting or reflecting inner linings. Closure 9 constitutes the major part of an independently operating mechanism for governing the degree and time of exposure to temperature variations to which chamber 6 is to be subjected for operating bellows 5. The operation of closure 9 is controlled by an independent thermostatic element 10. This entire mechanism is housed in a stationary mounting 11, which is directly associated with valve housing 1, and preferably forms, in part, the end wall of the latter, indicated at 1'. This mounting is provided with air circulating passages 12, located near the valve housing, and other passages 13 which are somewhat remote from the valve and are in near proximity to the right end wall of vessel 6. There are still other air passages provided in the mounting, such as indicated at 14 and 15. Corresponding to, and in cooperation, respectively, with passages 13 and 12, closure 9 is provided with passages 13', closing ring 8', closing flange 16, and a closing or end disc 17, which three latter means control the air circulation through passages 13 and 12, depending on the position of closure 9 within mounting 11.

Thermostatic element 10 is illustrated in this figure in the shape of a closed chamber or double diaphragm, filled with a thermostatic medium. Its stationary end is fixedly supported from mounting 11 by means of bracket 18, while its movable end is connected with disc 17 of the closure by means of an adjustable spring 19, attached to adjusting lever 20. The position of this lever and the tension of the spring 19 may be regulated by thumb-screw 21. Thermostatic element 10 is so designed that, when it is subjected to a certain temperature, the medium contained therein is expanded or volatilized, and causes its movable center portion to snap out to an expanded position, and snap back to its normal position, when the temperature drops.

In Fig. 1, thermostatic element 10 is shown in its normal, inoperative position. When the temperature influencing element 10 rises and its movable center portion snaps to its operative position, disc 17 is moved against vessel 6, while closure ring 8' is brought into contact with, or the near vicinity of, the rear wall 1' of the valve housing. Previous to this action, exterior motor member or vessel 6 had been exposed to circulating air currents of the prevailing room temperature, passing through the then opened passages 12 and 13 across the surface of the vessel. Any effect upon member 6 from the temperature emanating from valve chamber 1 is minimized by air circulating through ports 12. When now closure 9, through its leftward movements, blocks the passage of circulating air through apertures 12, 13 and 13', and assuming that the valve is used in connection with a heating radiator, chamber 6 is no longer being cooled by the circulating air, but is subjected to the heat emanating from the hot surfaces of the valve housing. This heat quickly accumulates, since it is trapped within the surrounding insulation of the closure parts.

As the heat rises, the thermostatic medium contained in chamber 6 will expand and vaporize, and the vapor thus forming will create sufficient pressure to force some of the medium from the chamber through passage 7 into bellows 5, where the medium is not only rapidly evaporated, but even super-heated, whereby a greater pressure is quickly built up within the bellows, resulting in an instantaneous movement of throttle 4 to its closing position against port 3. Due to this shutting off of the heat supply, the rise in the temperature of the air surrounding the valve is checked and this temperature will eventually begin to fall so that closure 9 will be caused to snap to an uncovering position in respect to vessel 6, thus exposing it to the circulation of air through passages 12, 13 and 13'.

This air circulation induces a cooling action upon the liquid contained in the chamber, and the formerly produced vapors are now caused to condense in chamber 6. Inasmuch as through this condensation the pressure in chamber 6 falls, the vapor from bellows 5 re-enters the chamber, thus causing the contraction of bellows 5 and the opening of port 3 by throttle 4. Bellows 5 contains only vapor at any time when used for controlling a heating medium.

When this device is used for controlling a heating medium, it may happen that, due to the heat transfer through the wall of tube 7, the liquid in vessel 6, near the attached end of the tube, will still volatilize, even though the vessel becomes exposed or uncovered by closure 9. This action will not interfere, however, with the operation of the device, provided that the outer portion of vessel 6 is cooled sufficiently fast as to cause a rapid condensation of the medium volatilized by the heat of tube 7. Vessel 6 and all subsequently described exterior vessels of the different modified forms should actually not be completely filled with liquid. When the valve is employed for controlling a cooling medium, it will be required that bellows 5, as well as chamber 6, be filled or nearly filled with a thermostatic medium or media which will volatilize rapidly at the outer portion of vessel 6, the moment the latter is uncovered. In controlling a cooling medium, heat is flowing all the time from vessel 6 to the cold valve body, and heat is supplied by the temperature of the air surrounding vessel 6 when the latter is uncovered. The moment, however, vessel 6 is covered, the supply of heated air is shut off, and the temperature surrounding vessel 6 drops rapidly, which causes the contraction of bellows 5 and the subsequent opening of throttle 4.

It is obvious, therefore, that the device described can be employed in connection with the control of either cooling or heating media conveyed to a radiator or like instrumentalities, which may be used during cool seasons for heating purposes, while during warm seasons it may serve as cooling radiator. If thus employed, for controlling either heat or cold, the exchange of the thermo-motor and element 10, or of their thermostatic media will be required. Instead of a single independent thermostatic element 10, a plurality of diaphragms may be employed if a more extensive movement of closure 9 is desired.

Referring now particularly to the operation of individual thermostatic element 10 and its exposure to the temperature of the air passing or circulating around it, it is to be noted that before the covering action by closure 9 of chamber 6 takes place, the actuating end of element 10 is relatively cut off from the circulating air, inasmuch as passages 13 are practically closed by the over-extending flange of disc 17. The moment, however, closure 9 moves to its covering position, it is necessary, for correct operation of the device, to increase the cooling effect upon element 10, since disc 17 of closure 9 becomes heated, and raises the temperature of the air surrounding element 10, which must be prevented. This is accomplished by opening passages 13 to the circulation of air, which will now pass the movable end of element 10 and cool it. If the device is to function accurately, it is essential that the temperature of element 10 be caused to fall after the covering action of closure 9, even though the room temperature remains constant or increases.

The drop in temperature to which element 10 is to be exposed, should be at least equal to the difference between the temperature at which the center portion of the element snaps out, and the temperature at which its center portion recedes to its normal position. In practice, it is preferable to lower the temperature about element 10 even more than that, in order to provide for an anticipating action, so that when the room temperature approaches the desired degree of heat, while rising, the action of thermostatic element 10 takes place before the ultimately desired temperature is reached, that is, element 10 will cause the covering of chamber 6 before that temperature is reached. The heat from the radiator, controlled by the valve, will continue to raise the room temperature for a time after the throttle is closed, and would cause the over-raising of the room temperature, were it not for the anticipating action.

It is possible to use over-compensation to cause the heating medium to be shut off for a short time and then turned on again before the desired temperature is reached. In other words, the heat is shut off and the mechanism, so to speak, waits to see whether the temperature rises to the desired point, and if not, it turns the heat on again, and this continues until the desired temperature is reached. This action is due to the element 10 alternately expanding and contracting until the desired room temperature is reached, admitting the heating medium for successively shorter periods and finally shutting it off completely. The proper operation of the valve depends upon the proper arrangement and sizing of circulating passages 12, 13, 14 and 15 of the mounting, and of the closing flange of disc 17 and of passage 13' of the closure, in combination with the thumb-screw adjustment of lever 20 and spring 19, whereby the spring pressure against the movable end of element 10 may be minutely regulated.

From the foregoing description, the general operating principle, and the purposes and functions of my invention, become clear. The dominant features of my device reside in the provision of an independent thermo-motor for actuating the throttle, and an independent thermostatically controlled mechanism for governing the operation of the thermo-motor, and provisions whereby the action of the mechanism may be adjusted for compensation or over-compensation for the purpose of overcoming 1. The lag in heating or cooling a room to the desired temperature by the radiator;
2. The lag in heating or cooling of the independent thermostatic element of the mechanism;
3. The lag in the action of the throttle due to the lag in heating and cooling of the medium in the exterior vessel; and
4. The temperature differential of the independent thermostatic element.

It is also clear that desired compensating or over-compensating effects in the operation of the device may not be obtained by the adjusting means of the mechanism alone, but depend also upon the proper determination of the sizes and arrangement of the circulating passages, to effect rapid or slow heating or cooling, at proper time periods, of the independent element of the mechanism, as well as of the exterior chamber 6. The above principal features of my invention are maintained throughout in the construction and operation of all hereinafter described modifications.

Referring now to Fig. 2, numeral 1 again indicates a valve housing in which operates throttle bellows 5, connected by means of tube 7 to exterior chamber 6', which latter possesses, instead of a rigid right-hand end wall, a flexible diaphragm 22. Against diaphragm 22 rests with its short arm a lever 23, suspended by a pin held in mounting 11'. The longer lever arm is designed to cooperate with wall 17' of closure 9'. The thermostatic element for controlling the operation of closure 9' in this case is in the form of a bi-metallic spring 10', pivoted at 24 and adjustable by means of adjusting knob 21'. The free or lower end 25 of element 10' engages the longer arm of another pivoted lever 26. The shorter hook-shaped arm of this lever engages, by means of a suitable opening, insulating closure wall 17'. The free end of bimetallic element 10' is separated from its pivoted end by a stationary insulator 27, which is covered at the left with a heat-conducting or heat-reflecting (or both heat-conducting and heat-reflecting) shield 28. The latter is provided for the purpose of aiding in providing compensating effects in the operation of element 10', similar to that explained in connection with Fig. 1.

The heat radiation of the shield increases the temperature affecting the bi-metallic element, especially during the time chamber 6' is in exposed or uncovered position. A fine adjustment of the element may be effected by thumb-screw 21'. Closure 9' is suspended from, and propelled to its covering position, by a pair of springs 29 and 30, when it is released by hook lever 26, after element 10' is caused to move the lower end of that lever to the left, when the desired room temperature is reached. The moment chamber 6' is covered, the temperature within the closure rises and expands the thermostatic medium in the chamber, until a point is reached at which bellows 5 close the valve. After chamber 6' is heated to a somewhat higher temperature, the higher pressure causes diaphragm 22 to snap outwards and induces the operation of lever 23, which in turn overcomes the pressure of springs 29 and 30, and pushes closure 9' into engagement with the hooking pawl of lever 26, provided, of course, that this lever at that time is released from contact with, and pressure to the left, by thermostatic element 10'. As long as this is not the case, there will be an intermittent operation of the closure to a covering and uncovering position, as chamber 6' is alternately cooled, when uncovered, or heated, when covered. The closure operating mechanism described above provides for a snap action movement.

A similar closure movement, and as effective an operation may be obtained, even though dispensing with thermostatic element 10', if spring 29 is made of thermostatic, bi-metallic construction, and suitable adjusting means for controlling its operation are provided. The operation of the device, thus modified, would give a graduated action and the flexible diaphragm 22 would not be necessary, so that chamber 6 of Fig. 1 could be used in place of chamber 6' of Fig. 2.

Figures 2, 3:
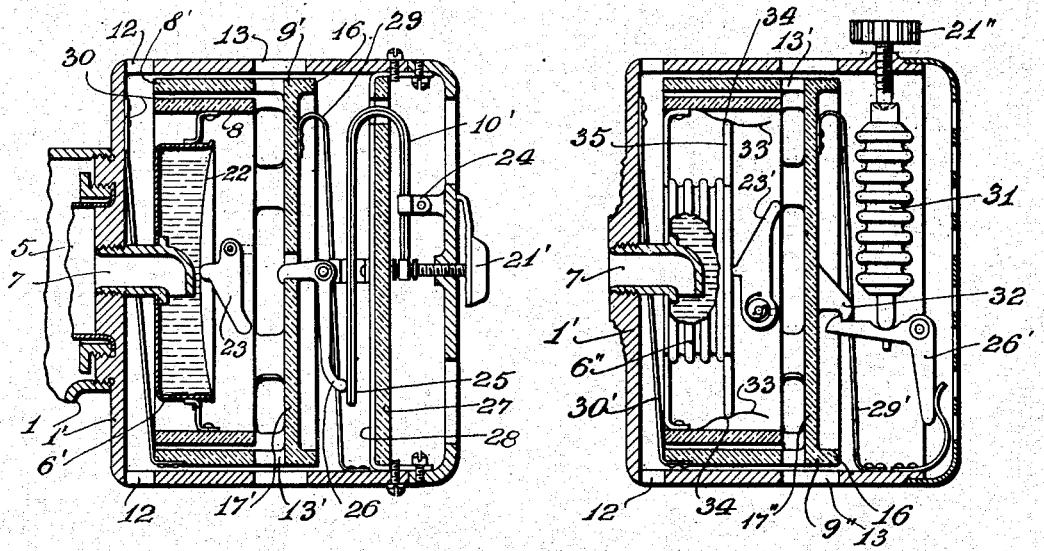
Fig. 2 is a vertical section of another embodiment of my invention, including certain additional features.
Fig. 3 is a vertical cross-sectional view through a third embodiment of my invention similar to that illustrated in Fig. 2.

The general construction and operation of the embodiment shown in Fig. 3 is practically the same as that of Fig. 2, with the difference that exterior motor member 6" is designed in the form of bellows, and the independent thermostatic element 31, controlling the operation of the closing mechanism, also constitutes a bellows arrangement. Against chamber 6" bears the shorter end of spring induced lever 23', which latter operates in the same manner as does lever 23 of Fig. 3. Closure 9" is suspended and operated by springs 29' and 30', and closure wall 17" is provided with a catch arm 32, adapted to engage a corresponding detent of spring induced lever 26', the latter being under operative control of element 31, which is rendered adjustable by thumb-screw 21". The functions of the different working parts of this device are practically identical with those of the corresponding parts of Fig. 2, with the exception of altering the inherent function of bellows-like chamber 6", which latter would ordinarily expand gradually when its thermostatic medium contained therein is subjected to heat.

In order to produce a snap action by bellows 6", I provide spring means 33, equipped with indentations 34, which latter hold an end plate 35, attached to bellows 6", in the position shown, until a sufficient pressure is built up within the bellows to overcome the tension of springs 33, at which moment plate 35 becomes released, permitting the bellows to snap to their expanded position. The same snap action becomes reversed when the thermostatic medium within the bellows is cooled off and the pressure is lowered. The bellows end-plate is held by the outwardly curved ends of springs 33 until the reduced pressure causes the bellows to contract. In both Figs. 2 and 3, the air circulating passages of the mounting and of the closure are controlled in the same manner as described in connection with Fig. 1.

Figure 4:
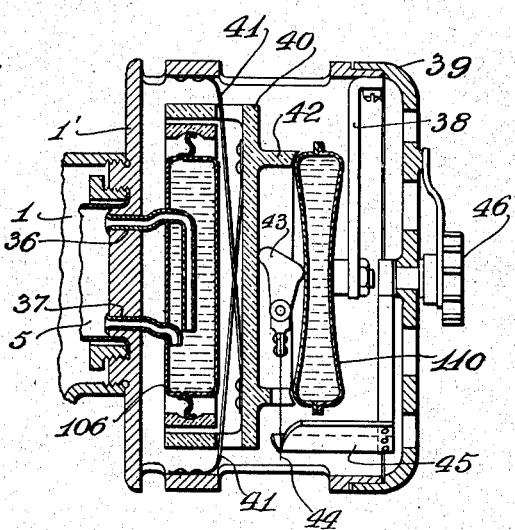
Fig. 4 is a partial cross-sectional view through a fourth embodiment of my invention, including a modified form of my thermo-motor.

In the modification shown in Fig. 4, throttle bellows 5 are connected to stationary chamber member 106 of the thermo-motor by an upper connecting and condensation tube 36 and a lower, liquid-conveying tube 37. In operation, vapor passes from bellows 5 through tube 36 into chamber 106 and condenses, whereas liquid is passed through tube 37 from chamber 106 to bellows 5 in return. The independent thermostatic element 110 of this construction is in the form of a chamber or double diaphragm, with normally concave walls, and is filled with a thermostatic medium. This chamber is fixedly suspended at its center at one side by bracket 38, depending from mounting 39, while its left concave side is free to operate.

Closure 40 is suspended by crosswise arranged springs 41, designed to keep it normally in the uncovering, illustrated position. Extending from the rear wall of the closure is a shielding ring 42, adapted to cooperate with the operating side of element 110. Between the rear wall of the closure and the operating side of element 110 is a lever 43, pivoted on a pin secured to the mounting, and provided at its lower end with an adjusting spring 44, the position and tension of which latter is regulated through cam 45, operated by adjusting knob 46. The adjustment of spring 44 varies the operation of the device for different temperatures at which action is to take place.

When closure 40 is in uncovering position, its ring 42 assumes a place close to the operating side of element 110, whereby the latter becomes heated quicker and expands correspondingly more quickly than if it were not covered on that side. However, as soon as the operating side of element 110 expands, lever 43 pushes closure 40 into covering position, whereby ring 42 becomes spaced from element 110, thus permitting a rapid cooling of the latter. This in turn causes the snapping back of its operating side, and the movement of the closure to the uncovering position shown. The aforedescribed modification may be so designed that the difference between the temperature of the surrounding medium, such as air, at which element 110 expands, and the temperature at which it contracts, may be exactly compensated so that such difference is nil. However, the device should be adjusted for over-compensation, which may be done by varying the insulating properties of closure 40 and by providing varying clearances between ring 42 and element 110.

The double tube connection between bellows 5 and chamber 106 promotes, after the uncovering action by closure 40, a quicker circulation between these two motor members, because the vapor is drawn through the upper tube into chamber 106, due to condensation therein, whereby the pressure is reduced within a relatively short time. This quick reduction in pressure within the thermo-motor causes a rapid action of bellows 5 in opening the throttle.

Figure 5:
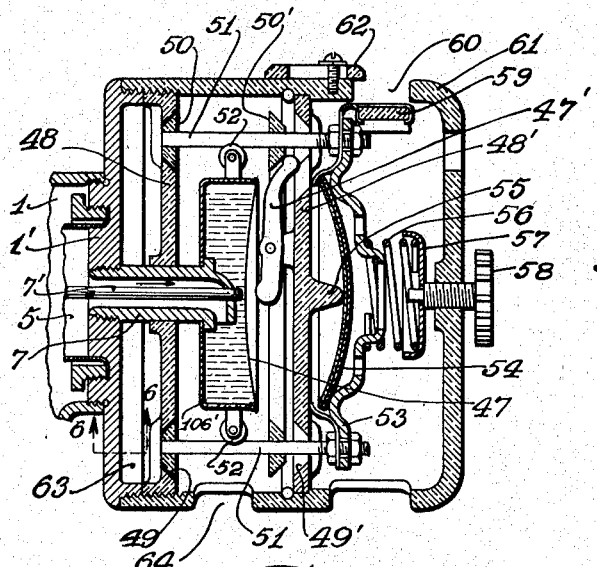
Fig. 5 is a partial cross-sectional view through a fifth embodiment of my invention, wherein a bi-metal thermostatic disc element of the convex-concave type is employed.

In the next modification of my device, illustrated in Fig. 5, the usual valve housing 1 is shown, in which again operates throttle bellows 5, attached to the rear wall 1' of the valve housing, and communicating by conduit 7 with exterior motor chamber 106', which latter is provided with a diaphragm 47, similar to that described in Fig. 2. Disposed on either side of chamber 106' are stationary insulating walls 48 and 48', provided with annular air circulating passages 49 and 49'. With these passages, register, respectively, annular rings 50 and 50', mounted together upon bars 51, and are so arranged that at one time one of the passages is closed by one of the annular rings, while the other passage is opened by the other ring, and vice versa.

These bars are preferably guided over rollers 52 and are connected to a floating frame 53, which latter is engaged and operated by an independent thermostatic element 54, in the form of a bi-metallic concave-convex disc or diaphragm. This element, upon being subjected to temperature changes, snaps to the right, thereby moving frame 53, and thus operating rods 51, causing the opening of passage 49 and the closing of the annular passages 49'. The center of element 54 bears against an extension 55, provided at the right-hand stationary insulating wall 48', whereby the movement of frame 53, through the flexing of element 54, is effected. To the same wall 48' is pivoted a double-arm lever 47', which latter is actuated by diaphragm 47 of chamber 106', when the diaphragm is caused to snap over to the right, as the temperature within chamber 106' rises. This causes the movement of rods 51, and of rings 50 and 50', in left-hand direction. Bearing against frame 53, containing the independent thermostatic element, is an adjusting spring 56, held in cup 57, and the tension of the spring may be regulated by thumb-screw 58.

At the upper end of frame 53 is provided a louver 59, adapted to close or open circulating passage 60, provided in mounting 61 of this modification. The size of opening 60 may be regulated by an auxiliary slide 62, whereby the operation of the device may be additionally controlled as to compensation or over-compensation, for the reasons stated previously.

Figure 6:
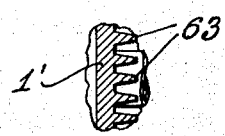
Fig. 6 is a partial cross-section taken on line 6—6 of Fig. 5.

At the valve wall 1' of the mounting are provided radiating fins or ribs 63, shown partially in cross-section in Fig. 6. While the device is in the position illustrated, air passes through bottom opening 64, into the space between insulating discs 48 and 48', the cools off the thermostatic medium contained in chamber 106'. The air progresses from this space through annular opening 49', about frame 53 and bi-metallic element 54, to without the mounting.

When the room temperature has risen sufficiently to affect bi-metallic element 54, the latter snaps from its shown position to the just opposite position. This operation causes the closing of the annular passage 49' by ring 50', while annular passage 49 is freed by ring 50, whereby louver 59 is moved to the right, freeing passage 60 and permitting air to circulate through the right-hand portion of the mounting, about the snapped-over element 54, thereby cooling it and compensating for the following rise in temperature, induced by the now heated insulating disc 48', and for the lag in operation of thermostatic element 54 between its snapping action from one position to the other. The heating of the now closed right-hand wall is caused by the confined circulation of air, entering through left-hand bottom passage 64, which air is forced through the lower portion of annular port 49 of the left-hand insulating disc 48, from where it rises and is warmed as it contacts with ribs 63. The heated air then leaves through the upper portion of annular opening 49 into the space between the two stationary insulating walls.

In this manner, chamber 106' is subjected to a rapidly increasing heat, which naturally also affects wall 48'. This heat expands the thermostatic medium within the thermo-motor, which in turn actuates throttle bellows 5. The thermostatic medium still continues to expand, which additional expansion causes diaphragm 47 to snap outwards to the right, whereby lever 47' is actuated and returns bars 52 and their closing rings to the position shown in the drawing. By the proper adjustment of thumb-screw 58, spring 57 is compressed or loosened, thus directly affecting the operation of element 54. Through a corresponding adjustment of the sizes of the various circulating passages, the device may be set for any degree of compensating, over-compensating (or anticipating) actions, as may be required for overcoming tardiness in movements, and for the purpose of maintaining room temperatures as uniformly as possible.

In Fig. 5, the flexible diaphragm 47 is not actually required in that construction for providing a snap action, such as is essential in the construction shown in Fig. 2, where diaphragm 22 must be depended on for such snap action, inasmuch as in Fig. 5 the bi-metallic element 54 has an inherent snap action and will operate closing rings 50 and 50' without the aid of the snap action of diaphragm 47. However, I purposely illustrate a flexible diaphragm because of a function which it may receive, which function has not yet been mentioned, but which may be provided in all cases where flexible diaphragms are shown.

It is sometimes desired to throw all thermostatic devices in a heating system out of operation for a period of time, as, for instance, in a school building which is closed over night. The morning after, when the walls, and other parts of the building, are cold, due to the heat having been turned off during the night, it becomes desirable to heat the building quickly. This may be readily accomplished by increasing the steam pressure in the heating system. During this forced heating period, the air temperature, which would be satisfactory after the walls and the interior of the building are heated, is not satisfactory while they are cold.

When now abnormal high pressure is applied and passed through the valves having flexible diaphragms, such as diaphragm 47 in Fig. 5, the effect will be that the high pressure will compress bellows 5 and move it in right-hand direction, which motion may be transmitted from the free end of the bellows by a rod 7' directly to diaphragm 47, whereby the latter is forced to snap out in a right-hand direction. The diaphragm will be held in this position, and while thus being held, will prevent element 54 from operating when being affected by temporary rises in temperatures. Thus, closing rings 50 and 50' will be retained in left-hand position, and the closure will remain open until an abnormally high room temperature has been reached, at which element 54 will overcome the pressure which has moved bellows 5 in right-hand direction.

It should be mentioned here that in all of my devices employing bellows, the latter are reinforced by suitable coil springs and are provided with means to prevent the bellows from being compressed beyond a safe point so as to prevent injury from either excess pressure within the bellows or from a vacuum formed therein when the bellows are cold. Such instrumentalities are not shown in the drawings, inasmuch as they are obvious and are commonly used in similar devices.

The flexible diaphragm shown in the various figures cannot be readily overstressed by a vacuum inasmuch as communicating tubes 7 act as safety stops for the inward movement of the diaphragm. These diaphragms also serve to prevent excessive pressure being built up within the thermo-motors, which pressure may cause damage thereto, in that when more than the usual pressure is formed within the motor, the flexible diaphragm snaps outwards and thereby opens the closure, which results in a quick cooling of the outer chamber and the subsequent fall in pressure within the motor.

Referring now to Figs. 7, 8 and 9, there is illustrated a device operating similarly to all previously described embodiments, but wherein the mechanical construction includes novel features for accomplishing the same basic results in a different, and perhaps more effective way. In these figures, the formerly used thermo-motor construction, consisting of throttle bellows and exterior chamber 116 is again employed, but the closure for the chamber is constructed in the form of two orange-peel-shaped pockets or insulators 65 and 65', which are capable of turning on their vertical axis to an extent of 90°. They are preferably provided with interior reflecting or radiating surfaces. Both of these insulators are identical in shape, but one is reversed relative to the other. They are mounted in vertical end bearings 66 and 66', as clearly seen from Fig. 8, so that their outer bearing tips 67 and 67' engage, respectively, bearings 66 and 66'. Their inner, shorter bearing tips interlock with the interior portions of their respective outer tips. In using this construction, the two orange-peel halves may be made from the same pattern and are therefore interchangeable.

Both insulators are provided with suitable recesses 68, shown clearly in Fig. 7, for accommodating communicating tube 7 of the thermo-motor. The insulators are adapted to move toward one another to either left or right (when observing Figs. 7 and 8), thereby either shielding chamber 116 against heat from the valve housing and subjecting it to the circulation of air from without, or exposing it to the heat emanating from the valve housing, while preventing air circulation from without. These closure positions are indicated in Fig. 7 in full and dotted lines, respectively.

The independent thermostatic element in this figure consists of a bi-metallic strip 69, fixedly secured at 70 to an arm 71, depending from mounting 72. The free end 73 of the element is provided with an extension 74, to which is attached one end of an overcenter operating snap spring 75. The other end of that spring engages a bearing 76 of a snap lever 77, which latter is suspended by means of a short spring 78 from a stationary yoke 79. The lower end of lever 77 is equipped with a louver 80, and above that louver there are provided loops 81 for operatively engaging corresponding loops of connecting rods 82, associated at 83 with the bottom faces of the two orange-peel-shaped halves of the pocket-like closure.

At the upper portion of the free end of the thermostatic element is a band 84, which secures the element to leaf spring 85, which latter extends downwards and is attached at 86 to the bottom portion of mounting 72. Above its attached end, the leaf forms stop or abutting means 87 and 88 for limiting the movement of the free end 73 of element 69. Leaf 85 may be positioned by means of thumb-screw 89, whereby the adjustment of element 69 is accomplished. Louver 80 at the bottom of lever 77 cooperates with an air passage 90, alternately closing or opening it, thereby preventing or promoting circulation of air through mounting 72 for influencing the operation of either element 69 or of chamber 116 of the thermo-motor.

Referring now to Figs. 10, 11, 12 and 13, there are again illustrated throttle bellows 5, communicating through pipe 7 with stationary motor chamber 116', which latter has a diaphragm wall 95, similar to that illustrated and described in connection with Figs. 2 and 5. The mechanism supported within mounting 96 possesses some similarity to that dealt with in connection with Figs. 7, 8 and 9, in that the closure consists of pocket-like insulators.

Figure 10:
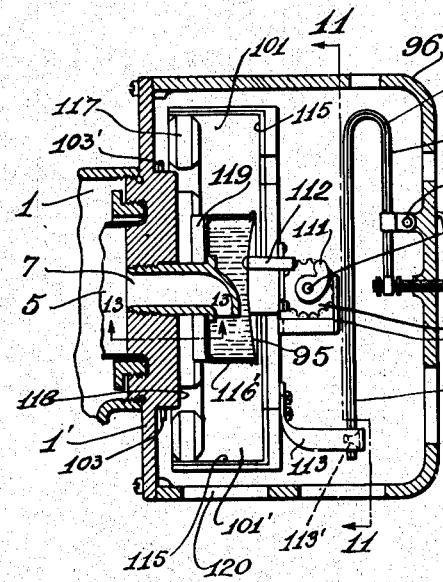
Fig. 10 is a partial cross-sectional view through still another modified form of my device, wherein cylindrical quadrant pockets are employed as closures for the stationary motor portion.
Figure 12:
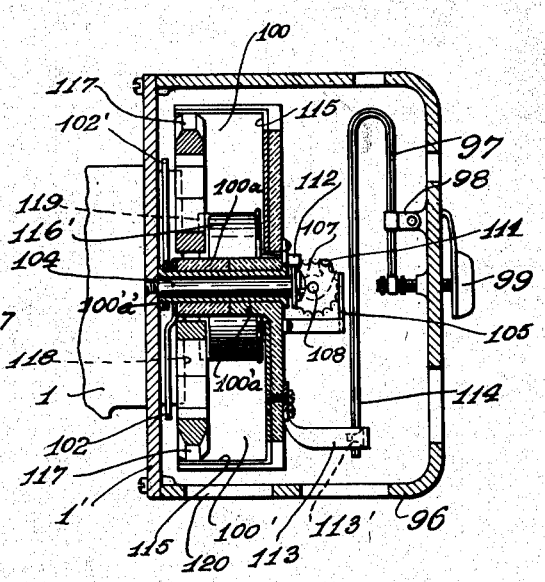
Fig. 12 is a partial cross-sectional view on line 12—12 of Fig. 11.
Figure 11:
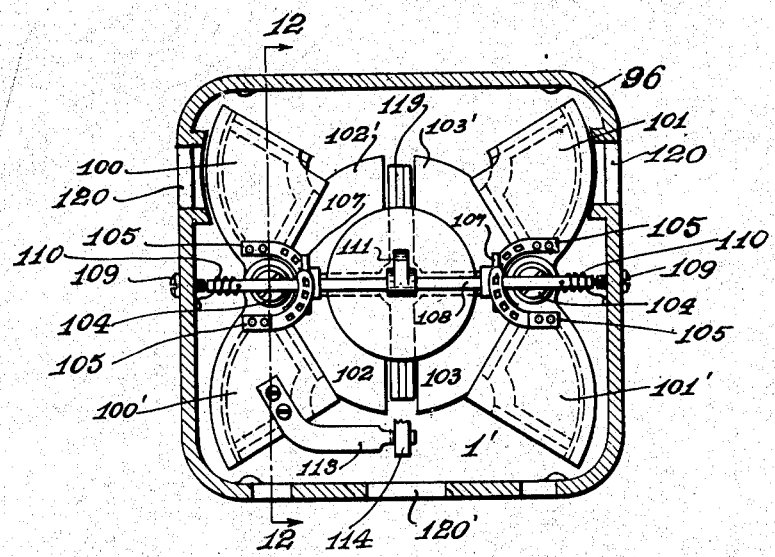
Fig. 11 is a sectional view taken on line 11—11 of Fig. 10.
Figure 13:
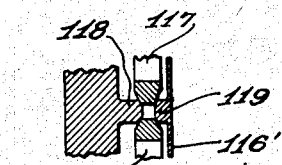
Fig. 13 is a partial cross-sectional detail view taken on line 13—13 of Fig. 10.

The independent thermostatic element 97 in this device consists of a bi-metallic spring, such as shown in Fig. 2. It is attached at 98, and its position is controlled by an adjusting knob 99. The construction of the closure in this case consists of four pocket-like cylindrical quadrants, which in all of the Figs. 10, 11 and 12 are shown in their open position. These quadrants marked 100, 100', 101 and 101' are adapted to cooperate in pairs with one another and with corresponding shields or reflecting plates 102, 102', 103 and 103'. Two of the pocket-like quadrants and two corresponding shields are mounted symmetrically on shafts 104, seen Figs. 11 and 12, so that, for instance, quadrant 100 is fixedly joined with plate 102, while quadrant 100' is directly connected with shield 102'. This connection is accomplished by providing quadrant 100 with a hub 100a, to the end of which is attached shield 102. In the case of quadrant 100', its hub 100'a is fixedly secured to a sleeve 100'a', to which latter shield 102' is attached. (See Fig. 12). Each pair of quadrants is provided with curved and spaced gear or sprocket racks 105, engaged by gears or sprockets 107, which latter are keyed to a common operating shaft 108, rotatably lodged at 109 (Fig. 11) in mounting 96, and which is held under rotary tension by coil springs 110. These springs are intended to normally turn the shaft in one direction. At the center of the shaft there is fixedly secured a cam 111, by means of which the shaft may be rotated in the direction opposite to that induced by springs 110.

In cooperation with diaphragm 95 of stationary chamber 116', there is shown (in Fig. 10) a pin 112, which when the diaphragm is caused to snap outwards, that is, to the right, will actuate cam 111. At one or both of the lower quadrants, as, for instance, quadrant 100', there is secured a catch arm 113, which is adapted to cooperate with the lower end 114 of thermostatic element 97. This catch arm is provided with a detent, shown in dotted lines at 113' in Figs. 10 and 12, adapted to engage lower end 114 of the element, for the purpose of holding all quadrants in their open position, against the tendency of springs 110 to close them. All quadrants are made of insulating material, as shown in sectional view in Fig. 12, and are lined with conductive material, indicated at 115, for the purpose of quickly transferring heat to the space surrounding chamber 116' when in the closing position. Also, at their interior surfaces are provided ribs 117, shown in detail in Fig. 13, which cooperate with fins or ribs 118, extending from the wall 1' of mounting 96, forming the back of valve housing 1. At the side opposite wall 1', chamber 116 is provided with similar ribs 119. (See Fig. 13.) When the quadrants are in closing position, their ribs 117 engage fins or ribs 118 and 119, and thus promote heat transfer to chamber 116' by conduction.

It will be seen from Fig. 11 that when the pocket-like quadrants are in their open position, for the purpose of promoting the cooling of chamber 116', the shields, operatively connected with these quadrants, and being efficient reflectors, interpose themselves between chamber 116' and the heated wall 1' of mounting 96, thereby preventing heat transfer to chamber 116'. The arrangement of the quadrants is such that when they are in their open position, they close circulating openings 120 provided in the mounting opposite one another, thus stopping air circulation through the mounting. This provides for a compensating action similar to that described in connection with the other designs.

In the aforedescribed figures, the independent thermostatic elements employed are shown arranged within the mountings. It often occurs, however, that it is desired to control the operation of the valve from remote places, in which case the mechanism for covering or exposing the exterior motor member may be actuated by a relay arrangement, such as an electro-magnetic device similar to that used in controlling the operations of heating and cooling machines. Inasmuch as such mechanisms are known, no illustrations are submitted.

Figure 14:
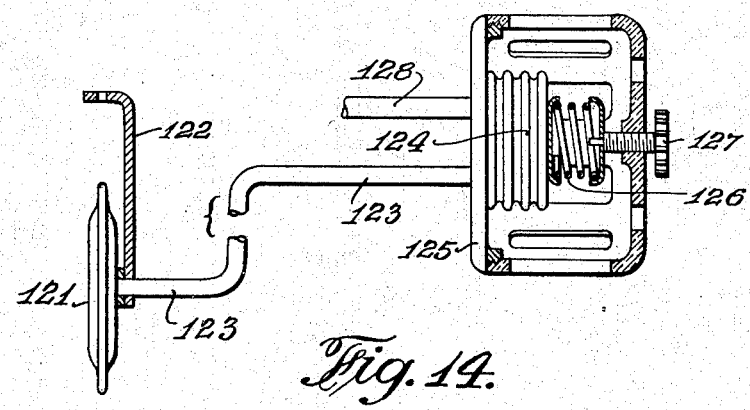
Fig. 14 is a fragmental illustration, partially in cross-section, of a remote control applicable to each of the embodiments illustrated in Figs. 1, 3 and 4.

A non-electric device with a suitable remote control is illustrated in Fig. 14. There is shown at 121 a thermostatic element, fixedly supported by arm 122, through which support passes a conduit 123 (shown exaggerated), and which conduit communicates with remote bellows 124 mounted in frame 125. The temperature at which action takes place is adjusted by thumb-screw 127. From bellows 124 extends another conduit 128, but it is obvious that not only one, but a plurality of such conduits may connect the bellows with a number of elements 121 of differently located valves. These bellows are exposed to the room temperature. The volume of the thermostatic liquid in the bellows comprises the major portion of the thermostatic liquid to be affected by the room temperature, while the volume of liquid contained in one or a plurality of elements 121 is comparatively small.

Thus, the operation of all elements connected with the bellows 124 by their respective conduits will be simultaneous and the same as if the elements themselves would be individually affected by the same room temperature.

While in the foregoing description specific constructions of my invention were defined, from the many modifications illustrated it is quite obvious that structural changes may be made, as my device finds employment for the control of different instrumentalities. Thus, for example, the flexible diaphragm of the exterior motor member, with a suitable coacting mechanism, as employed in Figs. 2, 5 and 10, may be readily omitted and non-flexible chambers, with their corresponding operating mechanisms, substituted, and by the same token, non-flexible chambers, such as shown in Figs. 1 and 4, may be provided with flexible diaphragms, to suit particular conditions.

The different latching or catching devices shown in Figs. 2, 3, 10, 11 and 12, may be altered or omitted, provided, of course, that adequate equivalents are substituted. By the same token, the independent thermostatic elements of the various devices may be substituted by one another, thus, for instance, the bi-metallic spring 73 and lever 77 shown in Fig. 7 may be replaced by a bi-metallic disc as shown in Fig. 5, or by a liquid-filled thermostatic chamber as shown in Figs. 1 and 4. Also, the suspension or operating springs for the closures, illustrated in Figs. 2 and 4, may be employed in connection with, for instance, the closure shown in Fig. 1. Changes may be also made in the construction of the closures, which, although preferably made of non-conducting or reflecting materials, or a combination of both, may be constructed in a different manner and from different materials. The same applies to the mounting within which the operating mechanism is arranged. Changes, such as indicated above, are obvious and may be readily made without the necessity of resorting to illustrations and further descriptions.

Summarizing, the principal advantages of my invention reside in the fact that I provide a relatively simple, inexpensive and accurately operating thermostatically controlled valve, wherein I employ an independent valve actuating motor, an independent mechanism for controlling the operation of the motor, and an independent thermostatic element by means of which that mechanism is actuated. The motor may be of a thermodynamic type, as illustrated in the different figures, or may be of any other suitable construction, so that one portion thereof constitutes the throttle actuating mechanism, while the other portion induces the operation of this mechanism, which in turn is governed by the operation of a closure mechanism, which latter is controlled by an independent thermostatic element.

Furthermore, the mode of operation of the timing of the motor and of the independent element may be controlled by the aforedescribed or equivalent means, whereby both of these instrumentalities are either heated or cooled for producing anticipating, or over-compensating effects in the operation of the valve, for overcoming lags, usually due to occur in the operation of such devices. Moreover, the independent thermostatic element is provided with minutely regulable adjusting means for especially controlling and timing the operation of that portion of the device.

Although I have illustrated specific structures and arrangements, it is readily evident that they are disclosed principally for the purpose of demonstrating the ease whereby such devices may be constructed to form practical operating mechanisms, which are applicable for controlling the operation of valves employed in heating or cooling plants, and which devices are capable of accurately maintaining uniform temperatures within confined spaces. It is also evident that modifications in such devices may become necessary, due to their special purposes for which they may be used, and I wish it to be understood, therefore, that I shall have the right to make changes and improvements, without departing from the broad scope and spirit of my invention, as defined by the annexed claims.

I claim:

1. In a thermostatically operated valve, including a valve housing having a passage and a throttle for opening and closing said passage, a self-contained thermo-motor associated with said valve housing and comprising a closed chamber, containing a thermostatic medium reacting to temperature changes, said chamber consisting of a movable interior member, forming the operating part of said throttle, and an exterior member, forming a continuation of the interior member, said interior member being disposed within the valve housing and adapted to be permanently exposed to temperature and pressure of the heating or cooling fluid controlled by the valve, said exterior member being mounted outside of, but sufficiently close to said valve housing to be directly influenced by the latter's temperature, a stationary mounting adjacent to said exterior motor member, a thermostatically controlled mechanism, disposed and operative within said mounting, for governing the temperatures affecting said exterior member, said mechanism consisting of an independent thermostatic element, exposed to a large degree to the exterior surrounding temperature, and to a smaller degree to the temperature emanating from the valve housing, a movable closure, for exposing or covering said exterior member, operatively mounted within said housing and controlled by said element, for alternately subjecting said exterior member to the influence of varying exterior temperatures, and manually actuated means extending from said housing and operatively connected with said element for adjusting and regulating the operation of said element.

2. In a thermostatically operated valve as per claim 1, and wherein said mounting and said closure are provided with a plurality of co-related air circulating passages for controlling the amount of exposure to temperature changes, by way of air circulation, to which said exterior member and said element are to be subjected, for effecting the operation of said throttle member.

3. In a thermostatically operated valve as per claim 1, and wherein snap action actuating means are provided for moving said closure to either a closing or an opening position.

4. In a thermostatically operated valve as per claim 1, and wherein one end of said exterior motor member is movable, and means in contacting proximity with said movable end of the exterior motor member, and interposed between the latter and said closure for actuating the closure when said movable end is caused to function.

5. In a thermostatically operated valve as per claim 1, and wherein said closure is provided at its interior surface with heat reflecting means and exterior insulating means.

6. In a thermostatically operated valve as per claim 1, and wherein said interior member constitutes an independent bellows arrangement, and wherein said exterior motor member consists of a closed, independent vessel, and wherein said members are provided with generously dimensioned communicating means for providing an unrestricted, quick flow of the thermostatic medium from one to the other member of the thermo-motor.

7. In a thermostatically operated valve as per claim 1, and wherein said closure comprises a structure for either covering or uncovering said exterior motor member, and wherein said mounting compasses said closure, and wherein the latter and said mounting are provided with air circulation passages.

8. In a thermostatically operated valve as per claim 1, and wherein said closure comprises a plurality of cooperating pockets, adapted to either enclose or free said exterior motor member.

9. In a thermostatically operated valve as per claim 1, and wherein said closure comprises stationary insulators, and operative closure means for promoting or stopping air circulation.

10. In a thermostatically controlled valve, an independent thermostatically operating throttle motor, including an operative throttle-actuating, interior member, exposed to the pressure of the medium controlled by the valve, such as steam, an exterior motor member connected with said throttle actuating member, said exterior member having a flexible wall, motion transmitting means associated with said throttle-actuating member, for moving outwards said flexible wall of the exterior member, an independent closure for the exterior member, for either covering or exposing the latter, an independent thermostatic element for actuating said closure, detent means operatively associated with the flexible wall of the exterior member and said closure, adapted to prevent, under desired conditions, the action of said thermostatic element, when said flexible wall is caused, by said means of the throttle actuating member, to assume an outward position.

11. In a thermostatically operated valve as per claim 1, and wherein said closure is provided at its interior surface with heat conducting means and exterior insulating means.

12. In a valve, a thermostatically operated throttle, a thermostatic motor for controlling the operation of the latter, said motor consisting of a throttle-actuating interior and an exterior part, said motor parts forming continuations of one another, said interior part being directly and permanently exposed to the influence of the medium controlled by the valve, said exterior part being adapted to be influenced by the temperature of the surrounding atmosphere and being disposed in such close proximity to the valve housing as to be exposed to the temperature emanating therefrom, means for alternately enclosing and uncovering the exterior part, to subject the latter to the influence of the temperature, alternately, of the valve housing and of the surrounding atmosphere, and an independent thermostatic element for controlling the operation of said enclosing means for indirectly governing the operation of said throttle.

13. In a valve as set forth in claim 12, and adjusting means for controlling the operation of said independent thermostatic means, and thereby governing the action of said throttle.

14. In a thermostatically operated device for controlling liquid or gaseous media, a valve housing, a thermostatic motor operative in said housing and comprising two portions, an interior portion, permanently and directly exposed to the influence of the controlled medium, and an exterior portion, exposed to the influence of the surrounding atmosphere and to the heat emanating from said housing, said thermostatic motor constituting two substantially centrally connected communicating vessels, and thermostatically controlled means exterior to the housing for altering the air circulation surrounding and affecting said exterior motor portion, for causing a variation in the rate of speed at which said exterior motor portion is either heated or cooled, thereby changing the speed of action of said interior motor portion, said means consisting of an instrumentality for alternately covering and uncovering bodily said exterior motor portion, and a temperature-sensitive, adjustable mechanism for actuating said instrumentality.

15. In a thermostatically operated valve, a valve housing, a throttle therein, a thermo-motor for actuating the throttle, the motor being composed of an interior throttle-operating and an exterior member, both motor members forming closely adjacent, intercommunicating compartments of a sealed vessel, the interior member being directly and permanently exposed to the influence of the medium controlled by the throttle, the exterior motor member being alternately exposed to heat radiations from the exterior of the valve housing and to the temperature changes of the atmosphere surrounding the exterior member, a mechanism, independent of said motor, for either covering or exposing the latter bodily, thereby governing the operation of the motor and, therethrough, the operation of the throttle, an independent thermostatic element controlling the operation of said mechanism, means for governing air circulation about said element and said exterior motor member provided with said mechanism for effecting temperature changes in the atmosphere surrounding said exterior member and said thermostatic element, and adjusting means for controlling the operation of said element and of said temperature change-effecting means, thereby controlling the operation of the throttle, said temperature change-effecting means constituting controlled air-circulating passages for either promoting or curtailing the circulation of air about both the exterior motor member and the independent thermostatic element.

16. In a valve, a thermostatically operated throttle, an adjustable thermostatically controlled mechanism, independent of and remote from said throttle, for indirectly governing the operation of the latter, a thermostatic motor forming a part of the throttle and comprising two closely adjacent communicating interior and exterior sealed vessels, the interior vessel constituting the operative element of the throttle disposed within the valve housing and being permanently exposed to the direct influence of the medium controlled by the valve, said exterior vessel being disposed outside the valve housing and being subjected to the combined influence of the temperature emanating from the valve housing and to the temperature of the surrounding atmosphere; said mechanism comprising means for either bodily covering or bodily exposing said exterior vessel.

SHERRILL S. RATHBUN.